No. 834,972. PATENTED NOV. 6, 1906.
E. M. FANCHER.
FURNACE FOR STEAM OR HOT WATER HEATING SYSTEMS.
APPLICATION FILED SEPT. 13, 1905.

4 SHEETS—SHEET 1.

Witnesses:
O. M. Wennich
E. K. Lundy

Inventor:
Eugene M. Fancher
By Frank D. Thomason
Atty.

No. 834,972. PATENTED NOV. 6, 1906.
E. M. FANCHER.
FURNACE FOR STEAM OR HOT WATER HEATING SYSTEMS.
APPLICATION FILED SEPT. 13, 1905.
4 SHEETS—SHEET 2.
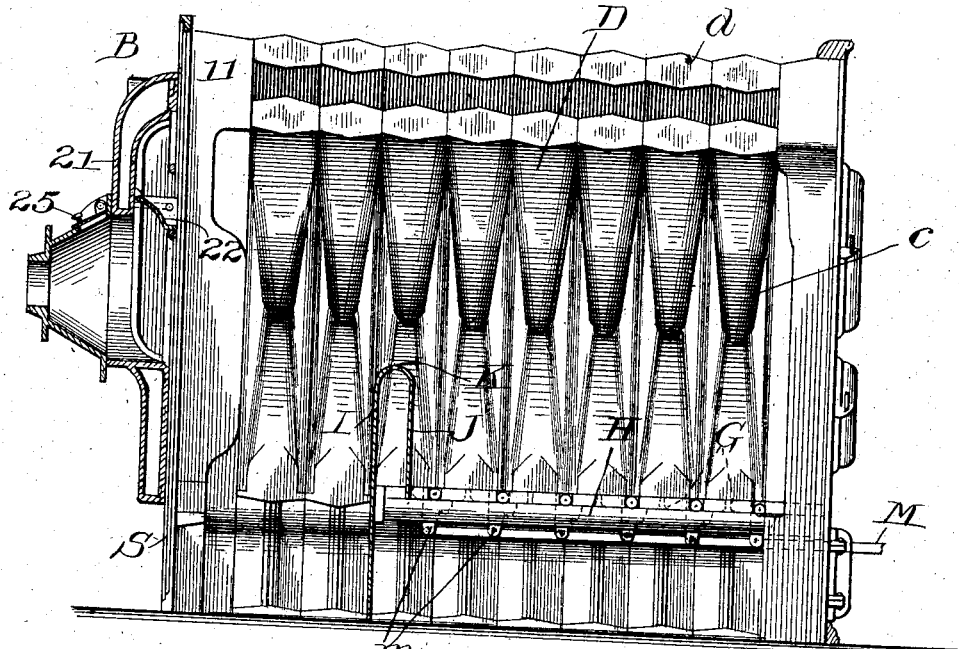
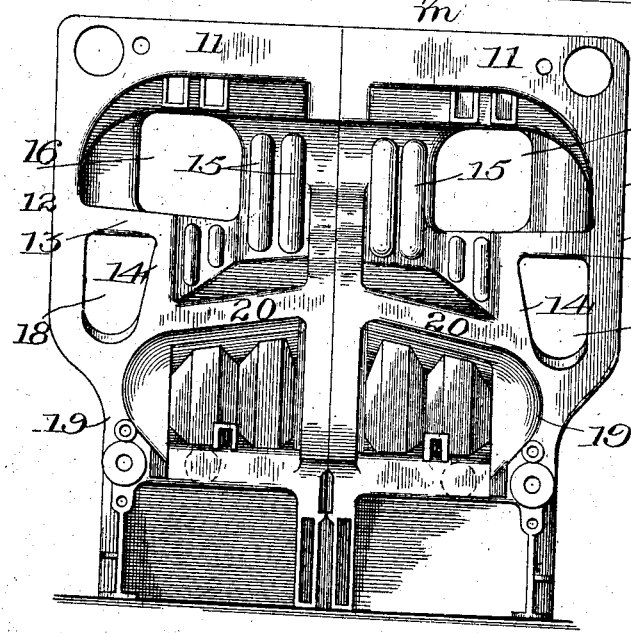
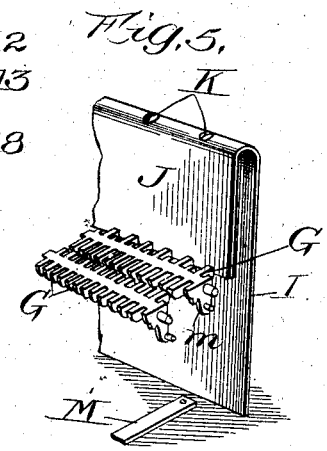
Witnesses:
O. M. Wennich
E. K. Lundy
Inventor:
Eugene M. Fancher
By Frank D. Thomason
Atty.

No. 834,972. PATENTED NOV. 6, 1906.
E. M. FANCHER.
FURNACE FOR STEAM OR HOT WATER HEATING SYSTEMS.
APPLICATION FILED SEPT. 13, 1905.

4 SHEETS—SHEET 3.

Witnesses:
Inventor:
Eugene M. Fancher
By Frank D. Thomason
Atty.

No. 834,972. PATENTED NOV. 6, 1906.
E. M. FANCHER.
FURNACE FOR STEAM OR HOT WATER HEATING SYSTEMS.
APPLICATION FILED SEPT. 13, 1905.
4 SHEETS—SHEET 4.
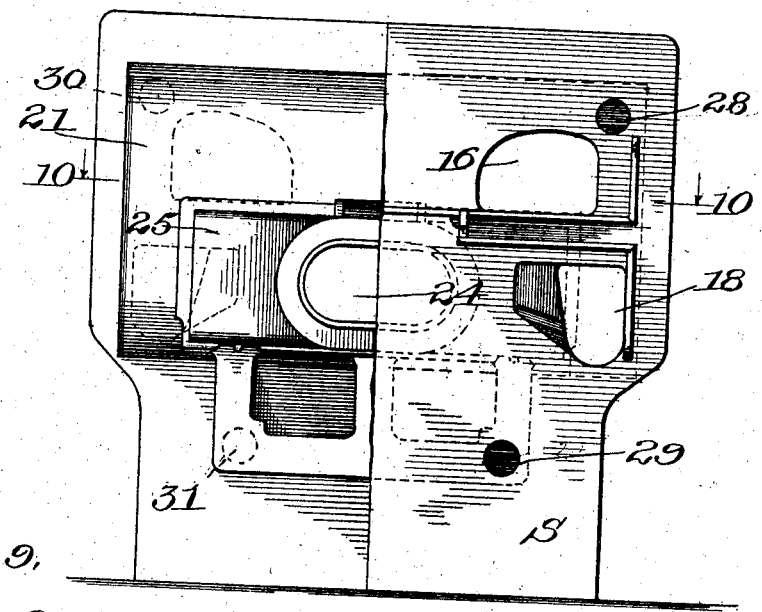
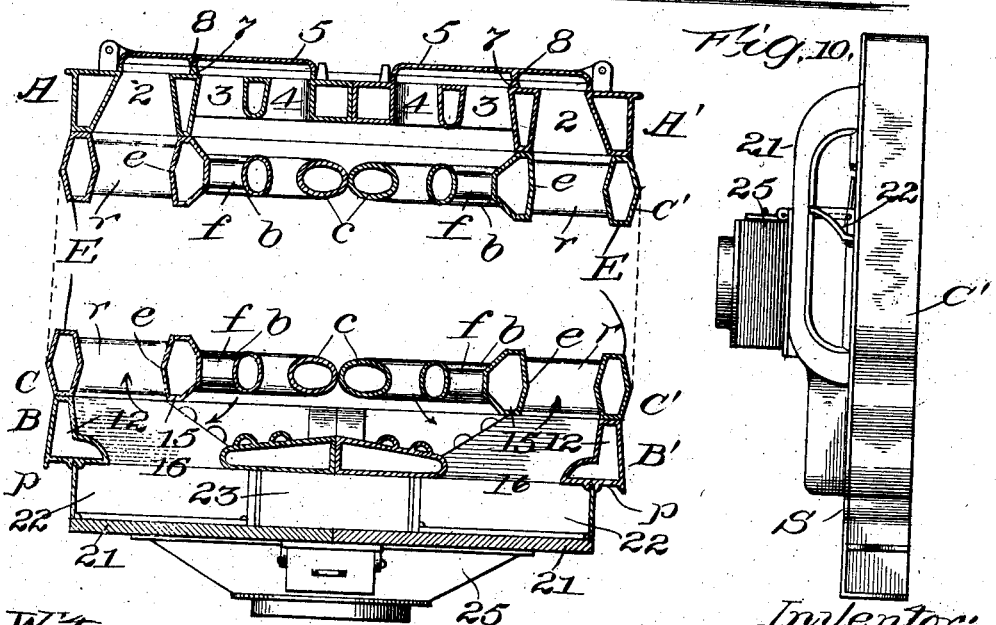

UNITED STATES PATENT OFFICE.

EUGENE M. FANCHER, OF CHICAGO, ILLINOIS, ASSIGNOR TO COLUMBIA HEATING COMPANY, OF CHICAGO, ILLINOIS, A CORPORATION OF ILLINOIS.

FURNACE FOR STEAM OR HOT-WATER HEATING SYSTEMS.

No. 834,972.     Specification of Letters Patent.     Patented Nov. 6, 1906.

Application filed September 13, 1905. Serial No. 278,247.

*To all whom it may concern:*

Be it known that I, EUGENE M. FANCHER, a citizen of the United States, and a resident of Chicago, in the county of Cook and State of Illinois, have invented certain new and useful Improvements in Furnaces for Steam or Hot-Water Heating Systems, of which the following is a full, clear, and exact description.

My invention relates to furnaces for steam or hot-water heating systems; and its object is to obtain an economically-constructed and easily-assembled sectional furnace which provides the largest possible water capacity consistent with the greatest amount of heating-surface, with the latter so disposed as to permit the free circulation of the water without interfering with the rise of the steam.

A further object is to accomplish this with the smallest effective expenditure of fuel by reason of a comparatively restricted combustion-chamber and extensive and most effective distribution of the heated products of combustion therefrom. This I accomplish by the means hereinafter fully described and as particularly pointed out in the claims.

Figure 1:
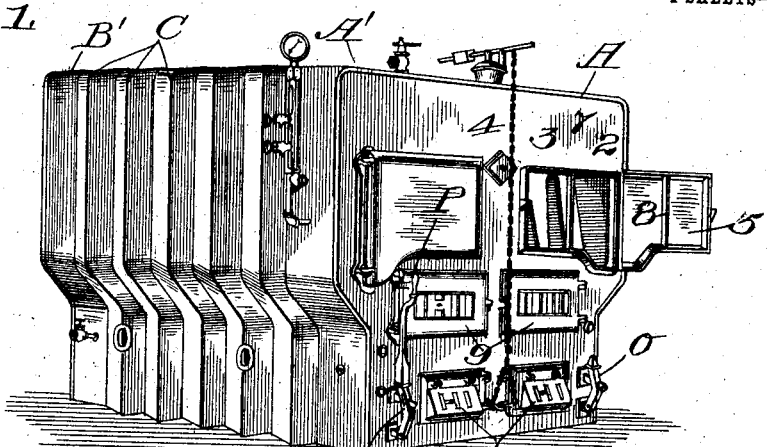
Figure 2:
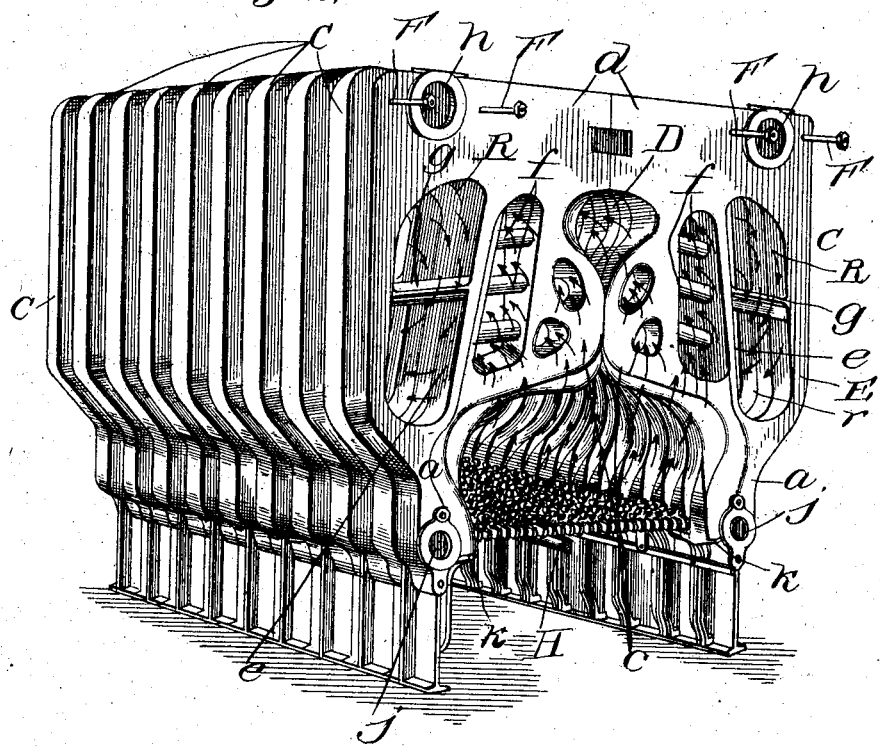
Figure 6:
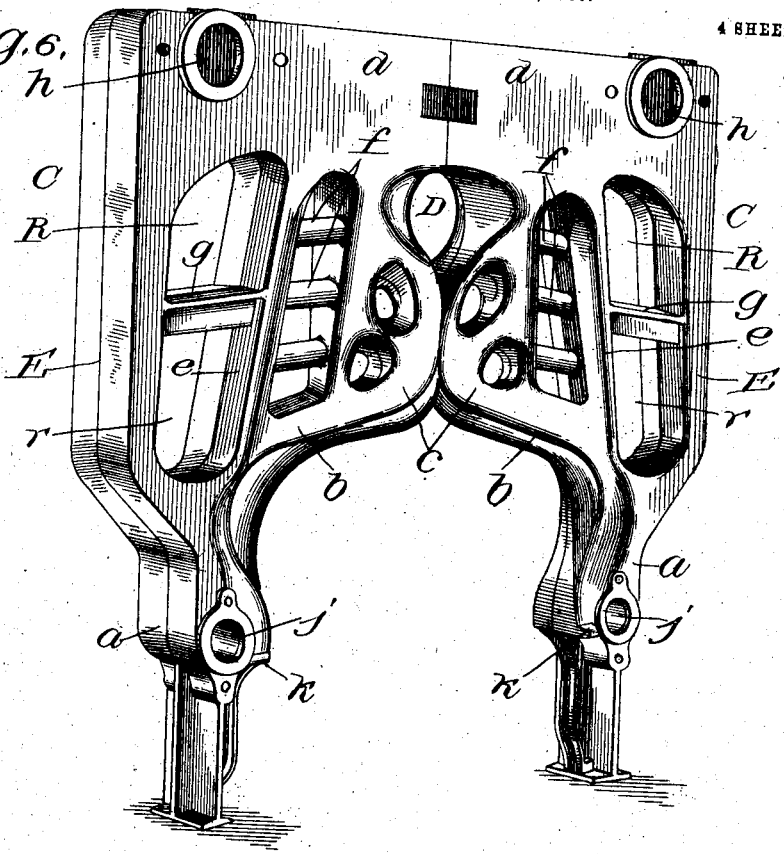
Figure 7:
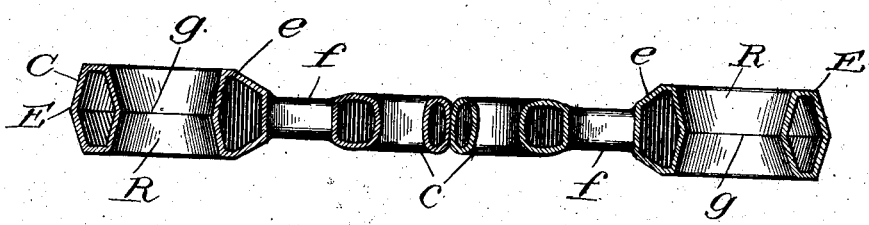

In the drawings, Figure 1 is a perspective view of my invention. Fig. 2 is a perspective view of the same with the front and rear sections removed. Fig. 3 is a longitudinal central vertical section thereof. Fig. 4 is a front elevation of the rear section. Fig. 5 is a perspective view of a broken-away portion of the smoke arch or bridge-wall and grate-bars. Fig. 6 is a perspective view of one of the dual sections. Fig. 7 is a horizontal section through the rear portion of the furnace. Fig. 8 is a rear elevation of the furnace, showing one-half of the smoke-box removed. Fig. 9 is a horizontal section taken on dotted line 9 9, Fig. 8, looking in the direction indicated by the arrows. Fig. 10 is a side elevation of the rear section and smoke-box with the plate closing the end of the latter removed.

In the drawings, A and A' represent the right and left corresponding members of the front section, B and B' the right and left corresponding members of the rear section, and C and C' right and left corresponding members of the intermediate sections of my improved furnace. Each member of the intermediate section comprises a leg $a$, which is hollow down to or, if desired, slightly below the plane of the grate. At a suitable point above the grate the hollow superstructure of these members branches inward and outward, the inwardly-extending branches $b$ forming the arch of the combustion-chamber, which preferably meet at a point midway the width of the furnace. Upon meeting these branches $b$ extend upward a short distance, then recede from each other and form a D-shaped enlargement $c$, the top of which merges into a steam-chamber $d$, extending clear across the top of each member. This D-shaped enlargement $c$ has two transverse openings therein, and when the two members are arranged edge to edge, as shown in the drawings, form between the upper curved edges of the said D-shaped enlargement a central transverse opening of greater dimensions than those in the enlargement $c$, which when said intermediate sections are arranged side by side form a central flue D, backward through which the products of combustion pass after leaving the combustion-chamber.

Between the vertically-disposed straight sides of the enlargement $c$ farthest from the center of width of the furnace and the outer vertical continuation E of the leg $a$ of each member a tubular upright $e$ connects the branch $a$ and the steam-chamber $d$. The space between the upright $e$ and the enlargement $d$ is utilized for flue purposes when the sections are arranged in proper position, into and through which the products of combustion flow in transit from the combustion-chamber to the chimney. This space is bridged over by a series of horizontally-disposed pipes $f$, which connect said upright $e$ and enlargement $c$, and a tubular bridge $g$ connects said upright and the outer extension E of the leg $a$ and divides said space between them into an upper and lower flue R and $r$, respectively. At about the point where branch $b$ extends inward the leg $a$ as it merges into the base of extension E bends outward sufficient to form a well-defined overhanging developed shoulder. The making of these shoulders on each side of the furnace results in the upper part of the furnace being much wider than the lower portion, and thus permits of an increase in the water capacity thereof.

Each member of the intermediate section has an opening $h$ in its side near its upper outer corner and has an opening $j$, preferably of less diameter, at the lowermost tubular part of its leg $a$. When these intermediate sections are properly assembled between the front section A and the rear section B of the furnace, by means of the longitudinal tie-bolts F F, these openings aline with each other and are connected by suitable nipples, so as to make a compound sectional boiler. The lower ends of the tubular portions of the legs are provided with inward-projecting portions which are narrower than the portions of the legs from which they project and have their lower ends overhanging and provided with lateral flanges $k$. The flanges $k$ of the contacting members of these intermediate sections meet and form bearings for the journals of the rocking grate-bars G, which latter preferably extend slightly less than one-half way across the combustion-chamber and have their opposite journals journaled in bearings made in a longitudinal beam H, located midway between the sides of the furnace below the grate-bars and extending from one end of the furnace to the other, or, as shown in Fig. 3, from the front section A to the bridge wall or arch I, located, preferably, at or near the rear of the combustion-chamber of the furnace. This bridge-wall I preferably consists of a vertically-disposed metal plate of sufficient thickness, which corresponds in width to that of the combustion-chamber and extends from the floor of the ash-pit up to the point where the branch $b$ bends inward from the legs $a$ and then is doubled back over itself to form a drop-wall J, which extends down back of the rear grate-bar and forms an air-chamber between it and the bridge-wall I. The air from the ash-pit passes up into this air-chamber and is expelled in a heated condition out of openings K K in the top or bend forming the top of the bridge-wall into the highly-heated products of combustion and greatly facilitates the more thorough burning of the same. The grates are provided at their ends next the legs of the members C and C' with downwardly-projecting arms $m$, which are pivotally connected to a longitudinal shaking-bar M. The forward end of this bar projects out through the front section A and is pivotally connected to a vertically-disposed lever O, the lower end of which is suitably fulcrumed to a suitable lug projecting from the front section and the upper end of which terminates in a suitable shank upon which when it is desired to rock the grates the socket forming the lower end of a suitable shaker P is fitted.

The members A and A' of the front section each correspond to one-half thereof, with their meeting edges contacting in a vertical plane midway between the sides of the furnace. These two front members correspond in shape and dimensions, and in the upper portion of each division above the plane of the shoulder formed by increasing the width thereof I provide three longitudinal openings. These openings are elongated vertically and arranged side by side, the opening 2 nearest the outer side of the furnace being longer than the others. The next opening 3 nearer the center of the furnace has its upper end terminating in the same plane as the upper end of opening 2, but its lower end above the sill of the same, and the opening 4 formed nearest the center has its lower end on the same plane as opening 3, and rises a little over one-half the height of opening 3. Opening 2 alines with the space between the tubular upright $e$ and the extension E of the leg of the intermediate sections, and the web or partition of the front section bounding this opening 2 is of such depth as to come in contact with the forwardmost intermediate section and separates said space from the portions of the intermediate sections coming between the tubular uprights $e$ of each member thereof. The depth of the members of the front sections alining with the space between the tubular uprights and the inner contacting edges of the members of the intermediate sections is less than that of the outer side portion of the front section, and openings 3 and 4 aline with the space between the tubular upright $e$ and the openings in the D-shaped enlargement $c$ of each member of the intermediate section, and these openings 2, 3, and 4 form the forward termini of the heated products of combustion in transit through the flues and passages formed by and between the extension E, the branch $a$, the tubular upright $e$, the D-shaped enlargement $c$, respectively, of each member of said intermediate sections. I provide a suitably-shaped door 5, that closes the forward ends of these openings 2, 3, and 4, which latter are bounded by a suitable rib or raised marginal portion 6 and with a similar vertically-arranged raised web 7, projecting forward from the forward surface of the partition separating openings 2 and 3. The inner surface of this door is provided with a vertically-disposed rib 8, which is so located that when said door is closed it comes in contact with rib 7 and separates opening 2 from openings 3 and 4. The members of the front section are also each provided with a door 9 leading into the combustion-chamber and a suitable door 10 leading into the ash-pit of the furnace.

The rear section B is, as stated, likewise composed of two members the transverse contours of which correspond to the members of the front section and are arranged in alinement with the members of the intermediate sections. The major portion of the members of this rear section are tubular, including its upper steam-chamber 11, (corresponding in position with the steam-chamber of the members of the intermediate section,) the continuation 12 of the leg, the tubular portion 19 of the leg itself, the transverse tubular portion 13, (corresponding in position and inclination to bridge $g$ of the members of the intermediate section,) the horizontal tubular portion 20, communicating with the continuation 12 at its outer end and with an upright portion 14 at its inner end, which latter corresponds in position and is in alinement with the lower part of the tubular uprights $e$ and the bridge $g$ of the members of the intermediate sections, respectively. All of the above-mentioned parts of the members of the rear section, together with a vertically-disposed wall in which the inner end of the transverse tubular portion 20 terminates, are of the same thickness as the top portion of the member and project forward from a rear wall S, extending from top to bottom of the furnace and forming the rear thereof. The forward surfaces of each member of said rear sections alining with the tubular uprights $e$, the branch $b$, the D-shaped enlargements $c$ of the intermediate members come in contact with the rear edges of said elements belonging to and forming part of the rearmost intermediate section. The portion of the front surface of each member of the rear section back of flue R of each member of the intermediate section is depressed or cut away, so as to form a transverse passage 15, through which the products of combustion passing from the rear of the central portion of the furnace between the right and left uprights $e$ and below the steam-chamber $d$ of the intermediate section can flow into and through said flue R on their way to the front of the furnace. The rear wall of these passages 15 is provided with openings 16 therein and communicate with a smoke-box, which will be hereinafter more fully explained. These members of the rear sections are also provided with openings 18 therethrough, which are bounded by the continuations 12, the upright portion 14, and the horizontal portion 20, and the rear end of these openings 18, which communicate with the smoke-box, is made wider by flaring it inward.

The smoke-box 21 comprises a rectangular shell secured to the rear of the upper portion of the wall S of the rear section B and extends from near one side edge thereof to about the same distance from the opposite side edge of the same and reaches from a point below the plane of the openings 18 to above the plane of openings 16 in said rear wall S. The walls of this smoke-box are hollow, and it is provided with an upper and a lower opening 30 and 31 in the surfaces thereof, contacting with the wall S of the rear section, which aline and communicate with similar openings 28 and 29 in said rear section by means of suitable nipples. The smoke-box thus constitutes the means which connects the right and left series of the sections forming my improved furnace, besides insuring the maintenance of the same water-level in both series of members and equalizing the capacity and efficiency of both. Box 21 projects from the rear of the wall S a suitable distance and is provided with horizontally-disposed partitions 22 near each end thereof, which separate openings 16 and 18, substantially as shown. The inner ends of these partitions terminate in a vertical plane slightly nearer the center of width of the furnace than the inner side of the opening 16, and which are so constructed as to provide suitable bearings for the journals of a horizontal damper 23, adapted to open and close the space between the ends of the partitions through which communication is had between the upper chamber of the smoke-box and the lower chamber. When this damper 23 is opened, the products of combustion entering passage 15 will flow directly out of opening 16 into the smoke-box past the damper 23 and out through a horizontally-elongated opening 24 in the lower portion of the box through a suitable cover 25 for said opening and from thence direct into the stovepipe. When said damper is closed, the products of combustion entering the passage 15 enter the longitudinal flue R above the bridge $g$ of the intermediate sections and pass forward therethrough into the opening 2 in the section A, whereupon they pass downward into the longitudinal flue $r$ below the bridge $g$ in said intermediate sections rearwardly to and through the openings 18, discharging into the lower port of the smoke-box, and from thence out through the cover of the opening 24 into the chimney.

What I claim as new is—

1. A sectional furnace comprising an intermediate section composed of two corresponding independent members each of which latter consists of an overhead steam-chamber that is out of communication with the opposite member, a water-leg which is divided into an outer and an inner branch, which latter arches over a portion of the combustion-chamber of the furnace and has its inner end terminating in a D-shaped enlargement that contacts with the opposite member, which enlargement, together with said outer branch, communicates direct with said steam-chamber, and a tubular upright connecting the lower portion of the inner branch and said steam-chamber.

2. A sectional furnace comprising an intermediate section composed of two corresponding independent members each of which latter consists of an overhead steam-chamber that is out of communication with the opposite member, a water-leg which is divided into an outer and an inner branch, which latter arches over a portion of the combustion-chamber of the furnace and has its inner end terminating in an enlargement that contacts with the opposite member, which enlargement, together with said outer branch, communicates direct with said steam-chamber, and a tubular upright connecting the lower portion of the inner branch and said steam-chamber.

3. A sectional furnace comprising an intermediate section composed of two corresponding independent members each of which latter consists of an overhead steam-chamber that is out of communication with the opposite member, a water-leg which is divided into an outer and an inner branch, which latter arches over a portion of the combustion-chamber of the furnace and has its inner end terminating in an enlargement that contacts with the opposite member, which enlargement, together with said outer branch, communicates direct with said steam-chamber, and a tubular upright communicating with said enlargement by cross-pipes, which upright connects the lower portion of said inner branch with said steam-chamber.

4. A sectional furnace comprising an intermediate section composed of two corresponding independent members each of which latter consists of an overhead steam-chamber that is out of communication with the opposite member, a water-leg which is divided into an outer and an inner branch, which latter arches over a portion of the combustion-chamber of the furnace and has its inner end terminating in a D-shaped enlargement that contacts with the opposite member, which enlargement, together with said outer branch, communicates direct with said steam-chamber, and a tubular upright communicating with said enlargement by cross-pipes, which upright connects the lower portion of said inner branch with said steam-chamber.

5. A sectional furnace comprising an intermediate section composed of two corresponding independent members, each of which latter consists of a water-leg which is divided into an outer and inner branch, which latter arches over a portion of the combustion-chamber of the furnace, a steam-chamber at the top with which both of said branches communicate direct, and a tubular upright connecting the lower portion of the inner branch and said steam-chamber.

6. A sectional furnace comprising an intermediate section composed of two corresponding independent members, each of which latter consists of a water-leg which is divided into an outer and inner branch, which latter arches over a portion of the combustion-chamber of the furnace, a steam-chamber at the top with which both of said branches communicate direct, and a tubular upright connecting the lower portion of the inner branch and said steam-chamber, and mediate its ends communicating by a bridge with the outer branch which latter divides the space between the two parts into an upper and a lower flue-opening.

7. A sectional furnace comprising an intermediate section composed of two corresponding independent members each of which latter consists of an overhead steam-chamber that is out of communication with the opposite member, and a water-leg which is divided into an outer and an inner branch, which latter arches over a portion of the combustion-chamber of the furnace and has its inner end terminating in an enlargement that contacts with the opposite member, which enlargement, together with said outer branch, communicates direct with said steam-chamber and a tubular upright connecting the lower portion of the inner branch and said steam-chamber, and, mediate its ends communicating by a bridge with the outer branch, which latter divides the space between the two last-mentioned parts into an upper and a lower flue-opening.

8. A sectional furnace comprising an intermediate section composed of two corresponding independent members each of which latter consists of an overhead steam-chamber that is out of communication with the opposite member, and a water-leg which is divided into an outer and an inner branch, which latter arches over a portion of the combustion-chamber of the furnace and has its inner end terminating in a D-shaped enlargement that contacts with the opposite member, which enlargement, together with said outer branch, communicates direct with said steam-chamber, and a tubular upright connecting the lower portion of the inner branch and said steam-chamber, and, mediate its ends communicating by a bridge with the outer branch, which latter divides the space between the two last-mentioned parts into an upper and a lower flue-opening.

9. A sectional furnace comprising an intermediate section composed of two corresponding independent members each of which latter consists of an overhead steam-chamber that is out of communication with the opposite member, and a water-leg which is divided into an outer and an inner branch, which latter arches over a portion of the combustion-chamber of the furnace and has its inner end terminating in an enlargement that contacts with the opposite member, which enlargement, together with said outer branch, communicates direct with said steam-chamber, and a tubular upright communicating with said enlargement by cross-pipes, which connects the lower portion of said inner branch with said steam-chamber and, mediate its ends communicating by a bridge with the outer branch, which latter divides the space between the said upright and outer branch into an upper and a lower flue-opening.

10. A sectional furnace comprising an intermediate section composed of two corresponding independent members each of which latter consists of an overhead steam-chamber that is out of communication with the opposite member, and a water-leg which is divided into an outer and an inner branch, which latter arches over a portion of the combustion-chamber of the furnace and has its inner end terminating in a D-shaped enlargement that contacts with the opposite member, which enlargement, together with said outer branch, communicates direct with said steam-chamber, and a tubular upright communicating with said enlargement by cross-pipes, which connects the lower portion of said inner branch with said steam-chamber and, mediate its ends communicating by a bridge with the outer branch, which latter divides the space between the said upright and outer branch into an upper and a lower flue-opening.

11. A sectional furnace comprising a front section, intermediate sections, and a rear section, said intermediate sections composed of two corresponding independent members, each of which latter consists of an overhead steam-chamber that is out of communication with the opposite member, and a water-leg having an inner and an outer branch and having an upper and lower flue formed between them, and said rear section consisting of tubular portions projecting from the front surface thereof contacting with the margins of and shutting off the said rear end of said flues from the central portions of the furnace and providing a transverse passage along through which the products of combustion communicate with the rear end of the upper flue, and a rear wall from which said tubular portions project, having openings therein in alinement with said flues.

12. A sectional furnace comprising a front section, intermediate sections, and a rear section; said intermediate sections each having two corresponding members that are, respectively, provided with two longitudinal forwardly-connected flues, the entrance to which from the combustion-chamber of the furnace is through the rear end of one of said flues, and said rear section having passages therein connecting said combustion-chamber and the entrance to said flues, and provided with openings therein in alinement with said flues, the means for controlling the exit through the opening alining with the entrant flue.

13. In a sectional furnace comprising a front section, intermediate sections, a rear section, and a smoke-box; said rear section having an upper and a lower opening on each side of the center thereof, and said smoke-box inclosing said openings and divided by partitions separating said openings into an upper and lower chamber, and provided with a damper connecting said chamber.

14. In a sectional furnace comprising a front section, intermediate sections, a rear section, and a smoke-box; said rear section having an upper and a lower opening on each side of the center thereof, and said smoke-box inclosing said openings, and divided by removable partitions separating said openings into an upper and lower chamber, and provided with a damper connecting said chamber.

15. In a sectional furnace comprising a front section, intermediate sections, a rear section, and a smoke-box; said rear section having an upper and a lower opening on each side of the center thereof, and said smoke-box inclosing said openings and divided by removable alining partitions separating said openings into an upper and lower chamber and provided with a damper connecting said chamber.

16. A sectional furnace comprising a series of intermediate sections each composed of two corresponding independent members, which latter each consist of one water-leg which, above the plane of the grate of the furnace, is tubular and has the inner portion thereof narrower than the outer portion, and the lower overhanging end of said narrower portion provided with lateral flanges, grates journaled in the bearings formed by said flanges between the water-legs of contacting sections, and a vertically-disposed sheet-metal bridge-wall the upper portion of which is bent back upon itself to form a drop-wall and which has perforations in the bend.

In testimony whereof I have hereunto set my hand this 13th day of April, A. D. 1905.

EUGENE M. FANCHER.

Witnesses:
FRANK D. THOMASON,
E. K. LUNDY.